United States Patent [19]

Cohen

[11] 4,231,321

[45] Nov. 4, 1980

[54] PET ACCESSORY FOR USE WITH A COMMODE

[76] Inventor: Floraine Cohen, 425 E. 80th St., New York, N.Y. 10021

[21] Appl. No.: 2,566

[22] Filed: Jan. 11, 1979

[51] Int. Cl.³ .............................................. A01K 29/00
[52] U.S. Cl. ........................................................ 119/1
[58] Field of Search ........................................... 119/1

[56] References Cited

U.S. PATENT DOCUMENTS

| | | | |
|---|---|---|---|
| 3,601,093 | 8/1971 | Cohen | 119/1 |
| 3,656,457 | 4/1972 | Houston | 119/1 |
| 3,734,057 | 5/1973 | Lee | 119/1 |
| 3,811,410 | 5/1974 | Roberts | 119/1 |
| 3,817,213 | 6/1974 | Chalmers | 119/1 |
| 3,842,803 | 10/1974 | Temel | 119/1 |
| 4,011,836 | 3/1977 | Temel | 119/1 |

*Primary Examiner*—Jay N. Eskovitz

*Attorney, Agent, or Firm*—Posnack, Roberts, Cohen & Spiecens

[57] ABSTRACT

A pet accessory is provided for use with a commode which rests on top of a conventional commode and is held thereon by downward protrusions which prevent horizontal displacement. The accessory has a trap door arrangement which can be controllably operated for purposes of discharging waste material. Encircling the trap door arrangement is a perforated tube into which water is fed via an electromagnetic valve for purposes of flushing the aforesaid waste material into the commode. The trap door arrangement is controlled automatically by a sensing device which senses that a pet has been on and departed from the trap door arrangement. This sensing device is in the form of a light source and photoelectric cell combination which also controls the electromagnetic valve. A ramp is provided for access to the pet accessory.

1 Claim, 4 Drawing Figures

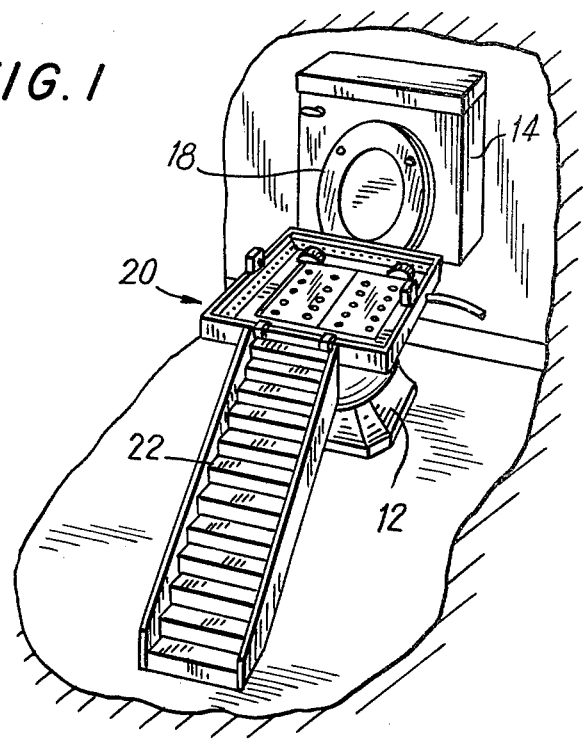
FIG. 1
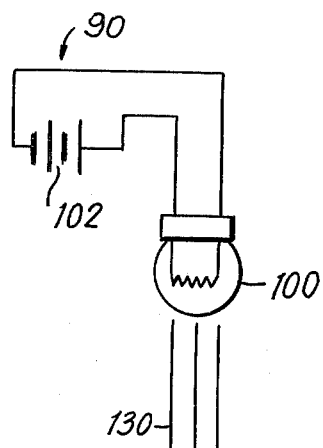
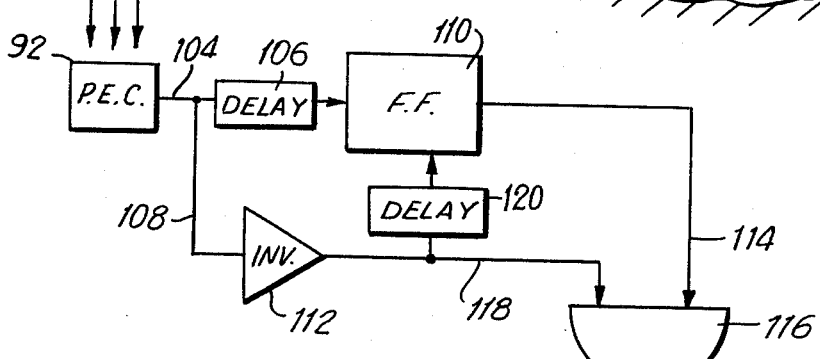
FIG. 4
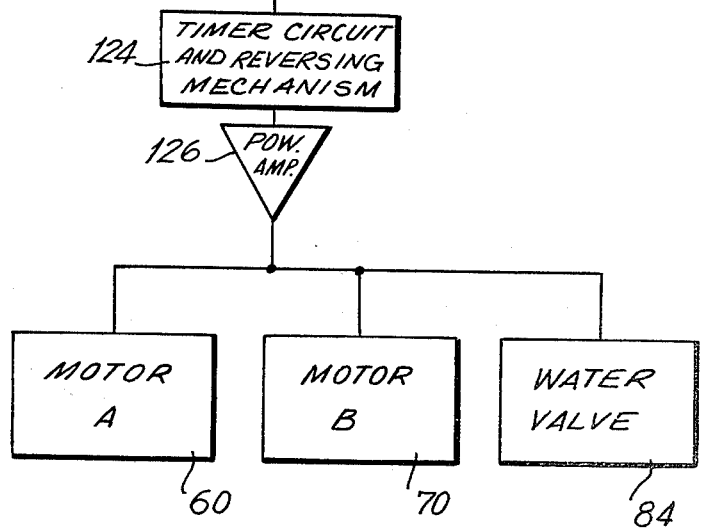

PET ACCESSORY FOR USE WITH A COMMODE

FIELD OF THE INVENTION

This invention relates to toilet accessories for household pets.

BACKGROUND

The present invention is basically an improvement over the pet accessory disclosed in my prior U.S. Pat. No. 3,601,093 which was issued Aug. 24, 1971. Therein was disclosed a pet accessory for attachment to a commode which accessory was held on the commode by hooks which prevented horizontal displacement. The accessory included an oval support having a central opening disposed above the commode. A trap door arrangement was provided which was manually operated for purposes of discharging waste material. The oval support was provided with an interior channel having radially disposed ports opening inwardly towards the trap door arrangement. A hose provided for connection with the interior channel and water was supplied by manual control.

The aforesaid arrangement has been very conveniently employed for a number of years. However, there are certain problems which have arisen which are not generally capable of solution by use of my previously patented device. Thus, for example, the trap door arrangement requires manual operation to provide for the discharge of waste material, whereas sometimes this is inconvenient such as when the pet is kept unattended in an apartment or other such living quarters.

Similarly, the flushing arrangement provided in my previous design is quite adequate for most purposes. However, it requires manual control and operation and is also inadequate under certain circumstances such as where a pet is left unguarded and unattended conditions.

SUMMARY OF INVENTION

It is an object of the invention to provide an improved pet accessory for attachment or use with a commode.

It is another object of the invention to provide improvements with respect to the pet commode disclosed in U.S. Pat. No. 3,601,093.

It is yet another object of the invention to provide for an improved pet accessory wherein the discharge of waste material is automatically controlled.

Yet another object of the invention is to provide an improved pet accessory wherein the operation of flushing the same with water is automatically controlled.

A further object of the invention is to provide an improved pet accessory wherein the pet may have direct access to the trap door arrangement thereof.

Still another object of the invention is to provide a pet accessory, the parts of which are demountable to provide for more facile cleaning thereof.

To achieve the above and other objects of the invention, there is provided a pet accessory for attachment to a commode comprising a support having an opening adapted to be located over said commode, a trap door means for selectively obturating said opening, electromechanical means for operating said trap door means, and sensing means for sensing when a pet has been on and departed from said trap door means for actuating said electromechanical means.

In accordance with a further aspect of the invention, a ramp or the like is provided which leads to the aforesaid support. Moreover, there is provided flushing means for flushing said trap door means under the control of said sensing means. Said flushing means may include a electromagnetic valve coupled to the sensing means.

The flushing means may, moreover, include a perforated tube detachably resting on the aforesaid support. Further, the support may include depending protrusions for locating the support on the commode.

Said electromechanical means may include at least one reversible motor with said trap door means including a flap operated by said motor, said sensing means may include a light source and a photoelectric cell in operative combination. A timing means may be provided to control the length of time that said trap door means is operated. This timing means may, furthermore, control the aforesaid flushing means.

To enable the operation of the accessory by the sensing means, a flip-flop and inverter may be provided which are coupled to the photoelectric cell included by said sensing means. An AND gate couples the flip-flop to said electromechanical means and a delay means couples said inverter to said flip-flop for a resetting of the latter.

In accordance with another feature of the invention, there may be provided timing and reversing means coupling said AND gate to said electromechanical means whereby the trap door means is first opened and then closed.

Other objects, features and advantages of the invention will be found in the detailed description which follows hereinafter as illustrated in the accompanying drawing.

BRIEF DESCRIPTION OF DRAWING

Figure 2:
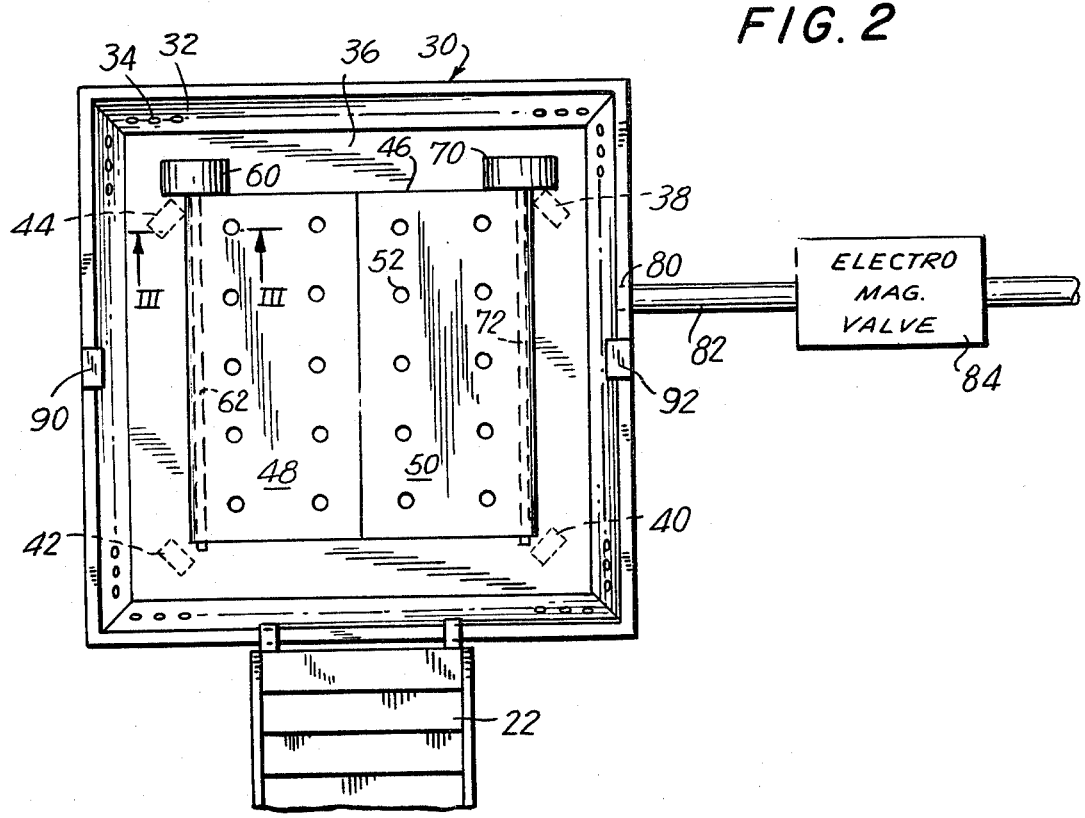
Figure 3:
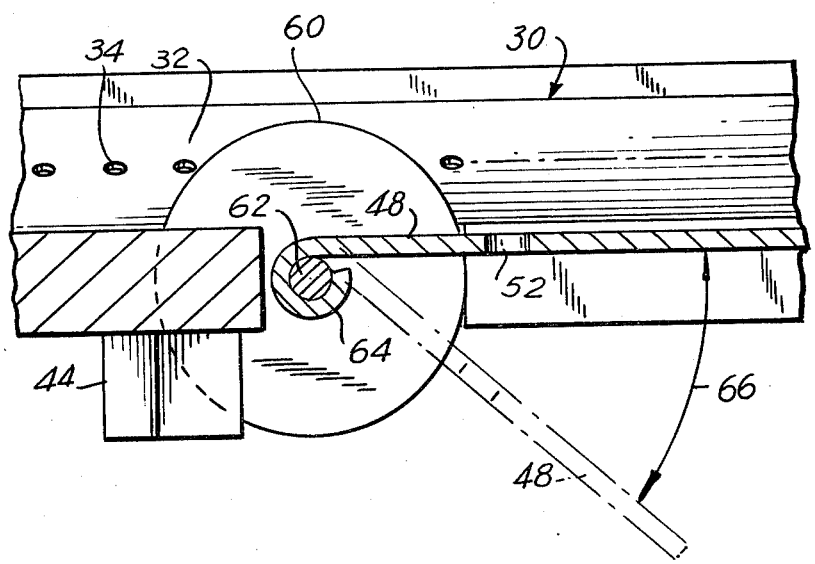

IN THE DRAWING:

FIG. 1 is a perspective view of a standard commode on which is mounted a pet accessory provided in accordance with the instant invention;

FIG. 2 is a top view of the pet accessory provided in accordance with the invention;

FIG. 3 is a broken away fragmentary cross-sectional view of the pet accessory of FIG. 3 taken along line 3—3 in FIG. 2; and FIG. 4 is a partly logical partly block diagram of an electric circuit providing for the automatic control of the pet accessory illustrated in FIGS. 1-3.

DETAILED DESCRIPTION

In FIG. 1 appears a standard commode 10 conventionally including a base 12 and a tank 14 as well as a hinged cover 18. For the mounting of the accessory of the invention, the cover 18 is pivoted into vertical attitude whereas the seat (not shown) is retained in horizontal attitude.

The accessory of the invention is generally indicated at 20. It rests on the seat of the commode. The accessory can also be designed for being supported directly on the porcelain basin as this will have no effect on the operation of the invention.

Also appearing in FIG. 1 is the ramp or stairway 22 by means of which the pet can have direct access to the pet accessory of the invention. This ramp can be detachably connected to the accessory to facilitate storage and the like.

As seen in FIGS. 2 and 3, the pet accessory of the invention includes a support 30. The support 30 is a quadrilateral structure fabricated of wood, plastic, hard rubber, metal or the like and the support should be generally strong enough to carry the remaining elements of the accessory as well as the weight of a pet which may be expected to use the same.

The support defines a recess wherein is accommodated a quadrilateral tubular structure such as indicated at 32. This tubular structure is fabricated of a perforated tube having openings 34 through which water may be discharged for purposes of flushing the interior portion 36 of the structure.

Beneath the support are a plurality of depending protrusions 38, 40, 42 and 44, the purpose of which is to center the support on the seat of the commode or on the porcelain basin of the same. The protrusions 38, 40, 42 and 44 extend downwardly through the opening of the seat or through the opening of the porcelain basin and prevent horizontal displacement of the support 30 thereupon.

The support 30 defines a central opening indicated at 46. The opening 46 is generally of quadrilateral shape and is generally obturated by a trap door arrangement consisting of flaps 48 and 50. These flaps are perforated and thereby provided with a plurality of holes 52 where through fluid wastes and water may be discharged downwardly into the associated commode.

Operatively associated with flap 48 is an electromechanical driving device such as motor 60. The motor 60 drives a shaft 62 to which the flap 48 is attached such as by curled section 64. The motor 60 has the purpose of driving the flap 48 back and forth from closed to open back to closed position as indicated by arrow 66. The motor 60 may be a commercially available motor which drives the flap through a predetermined angle such as illustrated in FIG. 3 whereupon the motor 60 may automatically reverse direction and bring the flap 48 back to its original position. Alternatively, as will be described hereinafter a circuit may be provided for the automatic reversal of the motor 60 by controls external thereto.

Similarly, the flap 50 is provided with a motor 70 in operative association therewith, the motor 70 driving a shaft 72 to which the flap 50 is attached. The motor 70 will operate the flap to open and close the same in the manner previously described with respect to the motor 60.

To provide water to the flushing arrangement 32 there is provided a nipple 80 to which is connected a hose 82. An electromagnetic valve 84 is inserted in the hose 82 to automatically control the flow of water into the flushing arrangement 32 and outwardly through the holes 34.

The accessory of the invention is controlled automatically by the ascending of a pet onto the trap door arrangement consisting of flaps 48 and 50 and the pet's departure therefrom. To achieve this objective there is mounted on the support 30 a source of light 90 and a photoelectric cell indicated generally at 92. The photoelectric cell 92 may also include packaged therewith the electronic circuitry to be described in greater detail hereinafter. However, before a discussion of that electronic circuitry is undertaken, it should be noted that the light source 90 and the photoelectric cell 92 are in operative association with one another such that a beam passes between the same which is interrupted when a pet positions itself on flaps 48 and 50 and which is restored when the pet leaves the trap door arrangement and descends from the accessory via the ramp or stairway 22.

Interruption of the beam passing from lamp 90 to photoelectric cell 92 and the subsequent restoring of the same upon departure of the pet will cause the subsequent opening of the trap door arrangement by operation of motors 60 and 70 as well as operation of the electromagnetic valve 84 by various techniques one of which is described hereinafter for purposes of illustration.

FIG. 4 illustrates the light source 90 as including a lamp 100 and a source of power 102 diagrammically indicated for purposes of illuminating the bulb. The photoelectric cell 92 is illustrated as connected to a line 104 in turn connected by lines 106 and 108 to flip-flop 110 and inverter 112 respectively. The flip-flop 110 is connected via line 114 to an AND gate 116. The other input of AND gate 116 is received via line 118 from the inverter 112. Inverter 112 is, moreover, connected via delay device 120 to the reset terminal of flip-flop 110 to serve a purpose hereinafter described. The flip-flop 110 is a conventionally available circuit which has two stable states, one of which it is cause to assume when a positive signal is received via line 106 and the other state of which it assumes when a signal is received from the delay device 120. The inverter 112 is a conventional circuit which inverts the signal received via line 108 to transmit the signal with opposite plurality to delay device 120 and via line 118. The AND gate 116 is a conventional electronic circuit which will transmit an output signal via line 122 when the signals on lines 114 and 118 are simultaneously positive.

The circuit, moreover, includes a timer circuit and reversing mechanism 124. A power amplifier 126 may be conventionally included in the circuit to provide for sufficient power to operate the motors 60 and 70 as well as the electromagnetic valve 84.

When a pet has interrupted the beam passing from lamp 100 to photoelectric cell 92, the beam being indicated generally at 130, the photoelectric cell 92 will pass a positive signal to the flip-flop 110 and will cause the flip-flop to be set (i.e., to assume one of its two stable states). In order to avoid interference with the reset signal which might be transmitted via inverter 112, a delay 132 is provided in line 106 which will enable the effect of the setting signal on line 106 to be the dominating signal. At this time, however, the signal passing through the inverter 112 will be inverted and a negative signal will pass via line 118 to the AND gate 116 which, as a consequence, will not pass an output signal onto line 122. Accordingly, motors 60 and 70 will not be operated and the trap door arrangement will not be operated as is, of course, required since the pet is now positioned on the trap door arrangement.

When, subsequently, the pet departs from the trap door arrangement and the beam 130 is restored, the negative signal passed via line 108 to the inverter 112 will be passed as a positive signal via line 118 to the AND gate 116. The positive signal will also be sent to the reset terminal of the flip-flop 110 but due to the delay device 120, will be delayed. As a consequence, there will be a simultaneous presence of positive signals on the lines 114 and 118 and AND gate 116 will pass an output signal onto line 122. This output signal will actuate the timer circuit and reversing mechanism 124 (which, as noted above, may alternatively be incorporated into motors 60 and 70). This will enable power to be passed from power amplifier 126 to motors 60 and 70 simultaneously to cause the same to operate first in one direction for a predetermined period of time and then in the opposite direction to both open the flaps 48 and 50 and to restore the same to their closed positions. At the same time, the electromagnetic valve 84 will be operated to cause a discharge of water from hose 82 into the flushing arrangement 32 and thence via openings 34 into the center of the support 30 and onto the flaps 48 and 50 whereby material deposited thereon will be washed into the commode therebeneath. To facilitate the discharge of waste materials into the commode, it will be possible to cover the trap door arrangement 48, 50 with paper upon which the pet will deposit its waste with a subsequent flushing of this paper into the commode for subsequent operation of the same when the owner of the pet returns home and sees that an operation of the commode is required.

From what has been indicated hereinabove, it will now appear clear that the invention provides a pet accessory for attachment to a commode comprising a support having an opening adapted to be located over said commode trap door means for selectively obturating said opening electromechanical means for operating said trap door means and sensing means for sensing when a pet has been on and departed from said trap door means for actuating said electromechanical means. It will appear that there are various substitutions possible for the lamp and photoelectric combination disclosed hereinabove. Thus, for example, it will be possible as an alternative to substitute for the photoelectric cell arrangement, a sensing switch which senses when the weight of the pet is on the trap door arrangement and when the pet has departed therefrom.

Also shown in the aforegoing disclosure has been a ramp or stairway leading to the support comprised by the pet accessory of the invention. This ramp as has been noted may be detachably connected to the support to facilitate storage and the like. The ramp can be fashioned in the manner of a stairway or can be fashioned as a continuous slope. The surface of the ramp may be covered with rubber or some other suitable material offering comfort and security to the pet.

The flushing arrangement of the invention is preferably detachable to facilitate complete cleaning of the support 30 and cleaning and repair of the flushing arrangement itself. The electromagnetic valve of the flushing arrangement may be connected in the hose 82 which itself may be connected to a tap of an adjacent sink or the like.

As has been noted above, the light source and photoelectric cell are one example only of a number of devices for sensing the presence and departure of a pet relative to the trap door arrangement of the accessory of the invention. Similarly, the circuit is illustrative only of a large number of circuits, the purpose of which is to sense that the pet has arrived at the accessory and has departed from the accessory in that sequence before operation of the trap door arrangement is permitted. This sequence is desired in order to avoid dumping the pet into the commode and assuring that the pet has first used the accessory of the invention and then departed therefrom before any attempt is made to dump the waste material into the commode and flush the support and trap door arrangement.

There will now be obvious to those skilled in the art many modifications and variations of the structures and circuits set forth hereinabove. These modifications and variations will not depart from the scope of the invention if defined by the following claims.

What is claimed is:

1. A pet accessory for attachment to a commode comprising a support having an opening adapted to be located over said commode, trap door means for selectively obturating said opening, electro-mechanical means for operating said trap door means, sensing means for sensing when a pet has been on and departed from said trap door means for actuating said electromechanical means, cleansing means for cleansing said trap door means under the control of said sensing means, said cleansing means including an electromagnetic valve coupled to said sensing means, said support including depending protrusions for extending into said commode and locating the support on said commode, said electromechanical means including reversible motors and said trap door means including flaps operated by said motors, timing means to control the length of time said trap door means is operated, and a ramp leading to said support, said cleansing means including a perforated tube detachably resting on said support, said sensing means includes a light source and a photoelectric cell in operative combination, said timing means further sensing that the pet has arrived between the light source and photoelectric cell and departed therefrom in sequence before controlling the said length of time, said timing means including a flip-flop and inverter coupled to said photoelectric cell, an AND gate coupling said flip-flop to said electromechanical means, a delay means coupling said inverter to to said flip-flop for a resetting of the latter, and timing and reversing means coupling said AND gate to said electromechanical means whereby the trap door means is first opened and then closed.

* * * * *